United States Patent
Childress

[15] 3,668,176
[45] June 6, 1972

[54] METHOD OF MOLDING UTILIZING THERMOSETTING RESINS AND MAGNETIZED FILLER MATERIAL

[72] Inventor: Clyde O. Childress, 3641 South Court St., Palo Alto, Calif.

[22] Filed: Jan. 15, 1970

[21] Appl. No.: 3,115

[52] U.S. Cl.........................260/37 EP, 260/37 R, 260/40 R
[51] Int. Cl.........................................................C08g 51/04
[58] Field of Search.....................260/37 EP, 37 R, 38, 40; 252/62.54; 264/32

[56] References Cited

UNITED STATES PATENTS

| 3,018,260 | 1/1962 | Creighton | 260/37 EP X |
|---|---|---|---|
| 3,024,711 | 3/1962 | Madison | 260/37 EP X |
| 3,068,433 | 12/1962 | Wroblewski et al. | 260/37 EP |
| 3,117,092 | 1/1964 | Parker | 252/62.54 |
| 3,379,643 | 4/1968 | Merkel | 252/62.54 |

FOREIGN PATENTS OR APPLICATIONS

| 720,477 | 10/1965 | Canada | 252/62.54 |

*Primary Examiner*—Lewis T. Jacobs
*Attorney*—Lindenberg, Freilich & Wasserman

[57] ABSTRACT

Liquid resins and plastisols can be made to assume and hold desired shapes, or to bridge gaps, not attainable with the present commercially available filled liquid resins or plastic puttys by employing a "filler" material, which has magnetic property.

5 Claims, 6 Drawing Figures

INVENTOR
CLYDE O. CHILDRESS
BY Ladenberg & Freilich
ATTORNEYS

METHOD OF MOLDING UTILIZING THERMOSETTING RESINS AND MAGNETIZED FILLER MATERIAL

BACKGROUND OF THE INVENTION

This invention relates to liquid resins and more particularly to a unique filler material for said resins.

It is common practice to use various metallic and other inert "filler" materials in epoxy and similar resin systems. The addition of these filler materials is aimed primarily at conferring a putty-like consistency to the normally liquid resins, and thus to allow thick sections to be built up in a single operation and to prevent run down and sag when the resin is applied to a vertical surface. Commercially available filled resins do not generally achieve these objectives due apparently to limitations on the amount of filler material that may be used without interfering with other required characteristics such as wetting the substrate, or obtaining the mixing consistency required to blend the resin and catalyst.

These commercial filled cements, marketed as body solders, body fillers, cement and filler, mender putty, and patch kits are generally supplied in two parts, a resin and a catalyst. The filler may be incorporated in both components or in the resin only when the catalyst is a small portion of the total material. Epoxy resins are most commonly marketed in this form although polyesters and other resins are sometimes used.

The slow "flow out" of these commercially available materials, when applied in thick layers, generally requires a constant reforming of the layer until it begins to cure. It is not possible to sculpt or shape such materials as one can with modeling clay or even with putty.

The "wet" or plastic dimensional stability of the filled resin cement, before it has set, is dependent on the viscosity of the resin and the adhesive forces exerted at the resin-particle interface. To achieve a putty like consistency with conventional inert filler materials it is necessary to incorporate particles of very small size with consequent great surface area. Thorough blending of these fine particle fillers with the liquid resin generally requires the use of roller mills or other such apparatus. If sufficiently large quantities of very high surface to volume fillers are incorporated to give good pre-cured dimensional stability to a liquid resin the liquid phase is so tightly held that the cement will not wet porous surfaces effectively.

OBJECTS AND SUMMARY OF THE INVENTION

An object of this invention is to provide a novel filler material which enables one to build up thicker layers of epoxy resin or other similar material, without "flow out," than has heretofore been possible.

Another object of this invention is the provision of a filler material which enables one to sculpt with a liquid epoxy resin, or similar resin system.

Another object of this invention is to provide a filler material which imparts superior precured plastic dimensional stability to a liquid resin and which may be easily combined with a liquid resin without resorting to sophisticated mixing apparatus or tedious and exacting manual mixing to ensure thorough wetting of the filler particles.

Another object of this invention is to provide a filler material for combining with a liquid resin to form a paste or putty which exhibits more consistent plastic stability when the liquid phase is subject to changes in viscosity due to exothermic cure reactions or applied heat used to accelerate the cure.

Another object of this invention is to provide a filler which does not significantly impair the ability of the incorporated resin to freely "wet" porous or deeply textured surfaces.

Still another object of the present invention is the provision of a filler material for a liquid resin whereby one can strengthen desired regions of the cured composite structure which is formed.

The foregoing and other objects of the invention are achieved by using a magnetic filler material either in the form of a powder or filaments which are mixed with the liquid resin.

Magnetic materials that have been found effective in this invention include ferromagnetic materials such as powdered Alnico 5 and chopped fine steel fibers as well as ferromagnetic materials such as magnetic iron oxide and barium and strontium ferrite.

The concentration of magnetic filler material to liquid resin and catalyst depends on the degree of plastic stability desired in the uncured state and upon the magnetic remanence, particle size and shape, and the specific gravity of the filler material as well as the flow characteristics of the liquid resin and catalyst portion of the mix. In practice, magnetic filler concentrations comprising from 10 to 60 percent by volume have been found effective. With a medium viscosity resin and a magnetic filler of permanent ceramic magnet particles of minus 200 mesh size, filler concentrations comprising 10 to 60 percent by volume have been found effective. At 10 to 20 percent the magnetic filler imparts plastic dimensional stability equal to or exceeding that of typical commercial filled resin cements or putty containing 50 percent filler concentrations, but unlike the commercial putty retains virtually the same ability as an unfilled resin to wet a porous substrate such as tightly woven glass cloth. Concentrations of magnetic filler from 20 to 50 percent by volume impart greatly superior plastic stability as compared with conventional fillers and yet may be extruded freely from a small opening in a dispensing tube. Above 50 percent concentration the magnetic filler imparts a progressively more "plasticene" like workability that may be kneaded and formed into complex self-supporting shapes.

Other filler materials may be combined with the magnetic filler to change the color or other characteristics of the material, providing such additions are not in sufficient quantity to negate the magnetic cohesion imparted by the magnetic filler.

The filler particles of this invention may be magnetized before mixing or the applied magnetic field may be utilized to simultaneously magnetize and mix the particles with the resin. In some applications where the resin and catalyst must be pressure fed continuously or on demand it may be advantageous to mix and magnetize the filler at or near the point of exit to take advantage of the ease of delivery of the unfilled liquid components.

The novel features of the invention are set forth with particularity in the appended claims. The invention will best be understood from the following description when read in conjunction with the accompanying drawings.

DESCRIPTION OF THE PREFERRED EMBODIMENT

In order to demonstrate the advantages of this invention over the prior art it was attempted to determine the maximum opening that could be patched or bridged in a ⅛-inch thick vertical "wall" with a commercial filled epoxy cement as contrasted with a liquid epoxy resin mixed with a fine particle magnetic filler material.

Figures 1, 2:
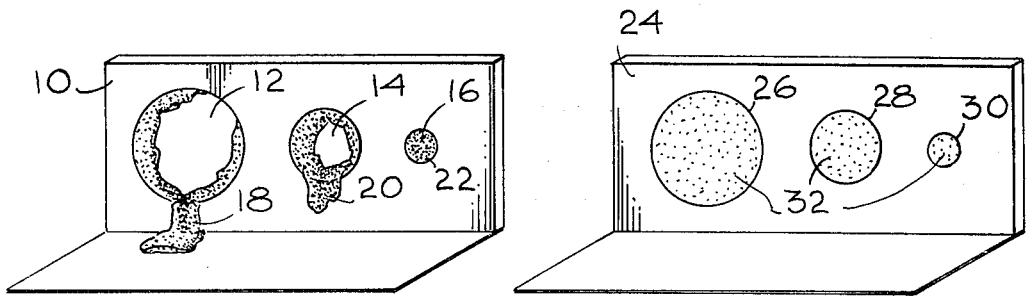
FIG. 1 shows the results achieved with a typical commercial "filled epoxy cement" used to patch or bridge circular openings in a ⅛-inch thick board held in a vertical position.
FIG. 2 shows the results achieved with an epoxy resin into which there has been mixed a filler material in accordance with this invention.

FIG. 1 illustrates the appearance of a ⅛-inch thick panel 10, with graduated circular openings of 1 inch, one-half inch, and one-quarter inch respectively 12, 14, and 16, which have been patched or closed with a commercial filled epoxy cement. Within 5 minutes most of this cement 18, has flowed out of the 1-inch opening and out of the one-half inch opening 20, and only the cement 22 in the one-quarter inch opening has successfully bridged the opening and retained its position long enough to cure.

FIG. 2 illustrates the appearance of a duplicate of the structure of FIG. 1 with the openings 26, 28, and 30 in the panel 24, filled with a liquid epoxy cement which has been mixed with a fine particle magnetic material in accordance with this invention. This magnetic epoxy cement 32, has successfully bridged all three openings. The magnetic filler employed was composed of sintered barium ferrite particles largely below 74 microns in size. The filler comprised 43 percent by volume of the mix.

Various commercial filled epoxy cements were tried and none successfully spanned the 1-inch and **-inch holes in the test shown in FIG. 1 and FIG. 2.

In order to further demonstrate the advantages of this invention over the prior art, it was attempted to determine the maximum vertical build-up that could be achieved with commercial filled epoxys as contrasted with the vertical build-up achievable by mixing a fine particle magnetic material with a liquid commercial epoxy. The epoxy with the conventional filler material, as well as the epoxy with the magnetic filler material were both sculpted into a vertical column while still in the uncured state.

Figures 3, 4:
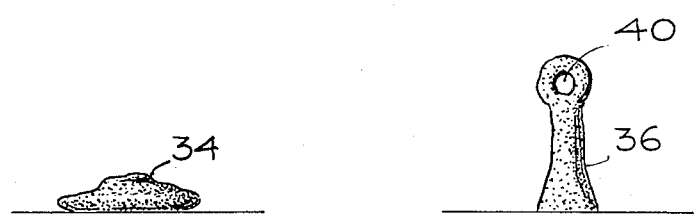
FIG. 3 shows the results achieved with a present commercial filled epoxy resin which was attempted to be formed into a vertical column.
FIG. 4 shows the result achieved with a liquid epoxy resin into which there has been mixed a filler material in accordance with this invention.

FIG. 3 illustrates the appearance of the commercial epoxy "putty and filler" which incorporates conventional filler materials. Within 5 minutes after sculpting, the material collapsed into the form 34.

The commercial epoxy putty represented in this figure showed the greatest degree of plastic stability of any of 10 such commercial materials tested.

FIG. 4 illustrates the appearance of the vertical column which was sculpted from a liquid epoxy which was mixed with fine particle magnetic material in accordance with this invention. The magnetic filler employed was pulverized permanent ceramic magnet particles below 74 microns in size in approximately an equal part by volume to the amount of epoxy which was used. The column of material 36 shown in FIG. 4 maintained its shape and dimension so successfully, that an opening 40 was also sculpted to illustrate how effectively the material held its shape and hardened in the shape in which it was sculpted.

The superior plastic dimensional stability of uncured cements incorporating the magnetic filler of this invention is apparently due to the ability of the magnetic particles to actively align themselves into cohesive networks within the liquid resin. This active particle cohesion does not require the use of extremely fine powders with great surface area, consequently the filler particles may be relatively large and easily dispersed in liquid resins without the use of roller mills or other such mixing apparatus. Since the cohesion of the magnetic particle filled resin is less dependent on the viscosity of the resin to bind the particles its stability is consequently affected to a lesser extend by changes in the viscosity of the resin due to exothermic reaction during the cure or when heat is applied to accelerate the cure.

In order to demonstrate the superior "wetting" ability of the filled cement or putty of this invention contrasted with presently available cements compounded with conventional fillers, a sheet of finely etched "ground glass" was placed in intimate contact with a larger sheet of plate glass and a small quantity of the cements to be tested were deposited against the edge of the ground glass so as to allow the liquid phase of the cement to penetrate the capillary opening between the glass sheets.

Figure 5:
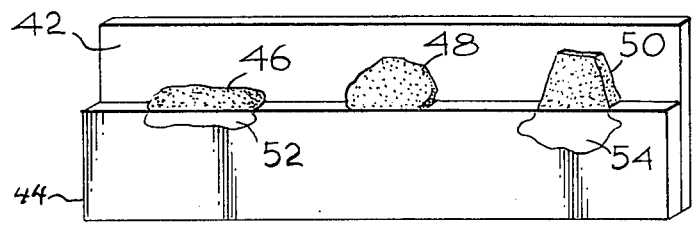
FIG. 5 shows the relative wetting ability of two commercial filled epoxy cements or putties as contrasted with an epoxy cement mixed with a magnetic filler material in accordance with this invention.

FIG. 5 shows the glass plate 42 and the juxtaposed ground glass sheet 44. Deposits of two conventional filled epoxy cements or putties 46 and 48 have been placed at the edge of the ground glass sheet, as well as a deposit 50 of a cement or putty mixed in accordance with this invention. The filled epoxy 46 represents the most free flowing of ten such commercial materials tested. The filled epoxy 48 represents the material with the best plastic dimensional stability of the 10 filled epoxy cements tested. The liquid phase of the sample 46 has penetrated the capillary space 52 between glass plates to a depth of approximately 2 millimeters. The deposit of the more dimensionally stable material 48 shows no significant penetration of the capillary space. The liquid phase of the material 50, which incorporates the magnetic filler of this invention, has penetrated the capillary space 54 to a depth of 5 millimeters, showing greater "wetting" ability than the free flowing commercial filled cement 46 even though it has greater dimensional stability than either commercial material 46 or 48. The filler material incorporated in the epoxy putty 50 is permanent ceramic magnet particles largely between 37 and 74 microns in size and comprising 50 percent by volume of the mix.

If the reinforcing filler material used in an epoxy or other such resin is present in the form of filaments, rather than a powder, and these filaments are magnetic, then an applied magnetic field may be used to selectively align the filaments so as to increase the strength of the final composite in the direction required to resist the expected maximum stress. Changes in the direction of the applied magnetic field can be made relative to the cure rate of the resin or other binder in such a manner that the filaments in one layer of the material may be aligned at right angles to the next layer. Filaments may be oriented to produce patterns of three dimensional alignment within a solid or a complex thin walled shape that may materially increase the strength as compared with a randomly oriented pattern of reinforcement.

Figure 6:
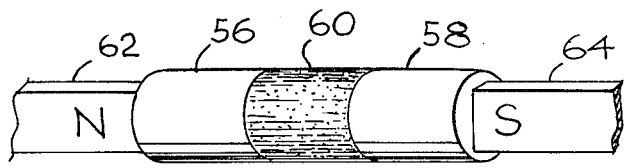
FIG. 6 shows an arrangement for reinforcing desired regions of an epoxy resin into which there has been mixed a filler material in accordance with this invention.

FIG. 6 shows an arrangement of the type described wherein two pieces of a metal bar respectively 56, 58, have placed therebetween epoxy 60 which is mixed with the magnetic filler material which has the form of fibers. The two poles respectively 62, 64 of a magnet are placed on either side of the metal rod to align the filaments along the axis of the metal rod. This will have the effect of increasing the resistance to bending of the finished product at the region of the epoxy material, over what it would be, should the epoxy be permitted to dry with the filaments more randomly dispersed than is the case when the magnetic field is used to provide the proper alignment.

In case of either fibers or powders, the application of a magnetic field to pull the filler material toward the carrier surface or mold form results in a maximum concentration of reinforcing material and therefore increased strength. This technique may be of particular interest when "chopped" fiber and resin and catalyst are "sprayed" onto a form.

There has accordingly been described and shown a novel and useful means for mixing a liquid resin epoxy or other resin with a magnetic filler material whereby the epoxy may be built up in thick layers without flowing and may be sculpted into self-supporting forms.

What is claimed is:

1. A method of forming shaped objects from flowable, curable, liquid resin materials comprising the steps of:
   mixing said resin material with 10 to 60 percent by volume of a particulate, magnetized, magnetic filler to form a plastic dispersion having increased, precured dimensional stability as compared to said material;
   shaping said dispersion into a self-supporting form; and
   curing said resin into a dimensionally stable shape in said form.

2. A method according to claim 1 in which the resin is a liquid epoxy resin.

3. A method according to claim 2 in which the particles of magnetic filler are no more than 74 microns in size.

4. A method according to claim 5 in which the ceramic magnetic filler is selected from magnetic iron oxide, barium ferrite, and strontium ferrite.

5. The method as recited in claim 1 wherein said magnetic filler comprises magnetic ceramic magnets.

* * * * *